US009312795B2

(12) United States Patent
Ishikawa et al.

(10) Patent No.: US 9,312,795 B2
(45) Date of Patent: Apr. 12, 2016

(54) ELECTRIC POWER TOOL

(71) Applicant: MAKITA CORPORATION, Anjo-shi, Aichi (JP)

(72) Inventors: Goshi Ishikawa, Anjo (JP); Takuya Kusakawa, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 14/297,287

(22) Filed: Jun. 5, 2014

(65) Prior Publication Data

US 2015/0002070 A1 Jan. 1, 2015

(30) Foreign Application Priority Data

Jun. 26, 2013 (JP) ................................. 2013-133915

(51) Int. Cl.
  *H02P 6/08* (2006.01)
  *B25F 5/00* (2006.01)

(52) U.S. Cl.
  CPC ..... *H02P 6/08* (2013.01); *B25F 5/00* (2013.01)

(58) Field of Classification Search
  CPC ..................................................... H02P 6/08
  USPC ......................................... 318/721, 720, 700
  See application file for complete search history.

(56) References Cited

U.S. PATENT DOCUMENTS

| 4,883,996 | A  | * | 11/1989 | Aoki ......................... 310/154.24 |
| 7,334,648 | B2 | * | 2/2008  | Arimura ......................... 173/179 |
| 8,067,913 | B2 | * | 11/2011 | Watabe et al. ................. 318/446 |
| 8,179,069 | B2 | * | 5/2012  | Matsunaga ............... H02P 6/08 |
|           |    |   |         | 318/430 |
| 9,048,699 | B2 | * | 6/2015  | Oomori et al. |
| 2007/0000676 | A1 |  | 1/2007 | Arimura |
| 2007/0193762 | A1 |  | 8/2007 | Arimura et al. |
| 2009/0096401 | A1 |  | 4/2009 | Watabe et al. |
| 2009/0295313 | A1 |  | 12/2009 | Suzuki et al. |
| 2011/0227430 | A1 |  | 9/2011 | Omori et al. |
| 2012/0191250 | A1 |  | 7/2012 | Iwata et al. |

FOREIGN PATENT DOCUMENTS

| EP | 1738877 A2 | 1/2007 |
| EP | 1825964 A1 | 8/2007 |
| EP | 2039479 A1 | 3/2009 |
| EP | 2127824 A2 | 12/2009 |
| JP | A-2009-50932 | 3/2009 |

OTHER PUBLICATIONS

Nov. 4, 2015 Search Report issued in European Patent Application No. 14172236.3.

* cited by examiner

*Primary Examiner* — David S Luo
(74) *Attorney, Agent, or Firm* — Oliff PLC

(57) ABSTRACT

An electric power tool includes a motor with a rotor having a permanent magnet; a control unit that sets a control amount of the motor in accordance with operation of an operation portion and that drive-controls the motor based on the control amount; and a number-of-rotations detection unit that detects the number of rotations of the motor. During driving of the motor, when the number of rotations detected by the number-of-rotations detection unit has reached an upper limit number of rotations set in advance, the control unit shifts drive control of the motor to rotation control, in which the control amount is made to be increased or decreased so that the number of rotations of the motor becomes a predetermined target number of rotations.

6 Claims, 7 Drawing Sheets

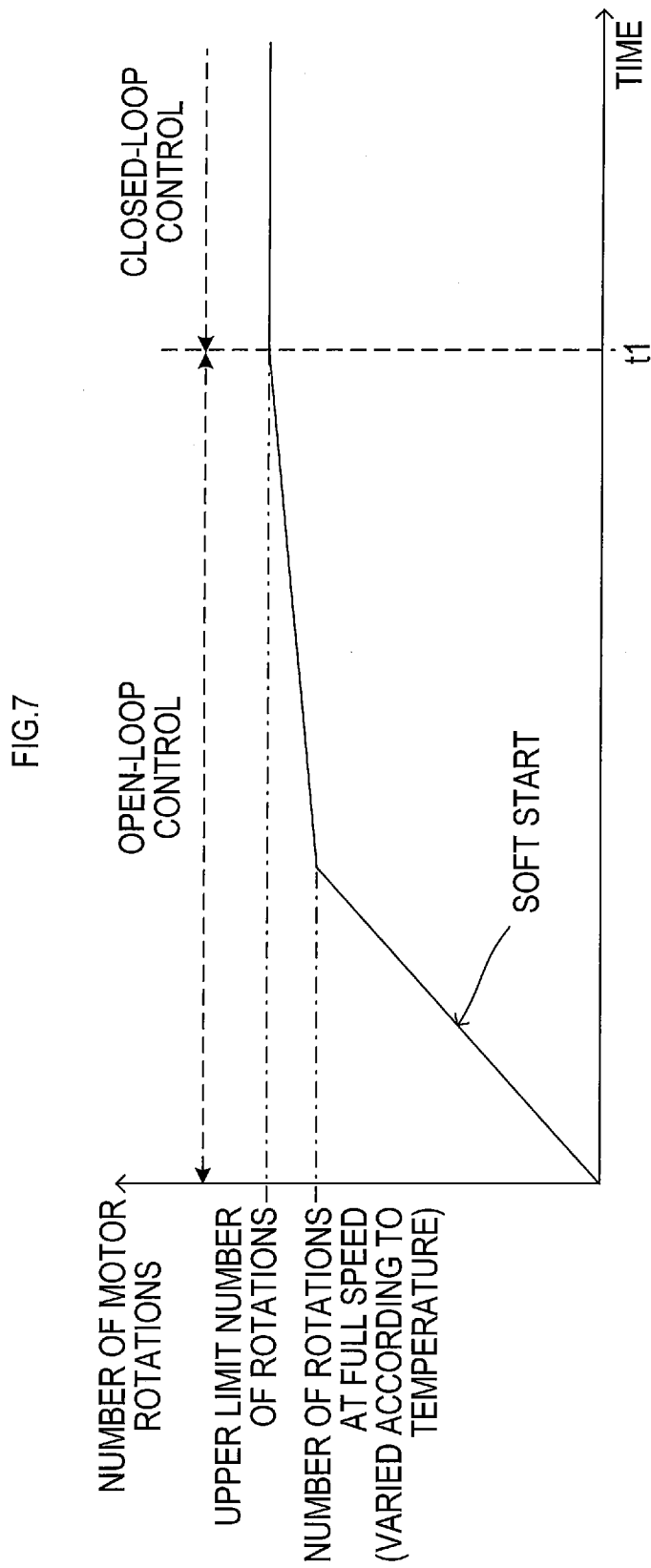

ELECTRIC POWER TOOL

CROSS-REFERENCE TO RELATED APPLICATIONS

This application claims the benefit of Japanese Patent Application No. 2013-133915 filed on Jun. 26, 2013 in the Japan Patent Office, the entire contents of which are incorporated herein by reference.

BACKGROUND

The present invention relates to an electric power tool including a motor whose rotor comprises a permanent magnet.

An electric power tool is known that is configured to drive-control a motor by setting a driving duty ratio for pulse width modulation (PWM)-controlling the motor in accordance with an operation amount of an operation switch, and by turning on/off switching elements in a drive circuit based on the driving duty ratio (see, for example, Japanese Unexamined Patent Application Publication No. 2009-050932).

In the electric power tool of this type, the driving duty ratio, which is a control amount of the motor, is set in accordance with the operation amount of a variable speed switch. Therefore, it is possible to control electric power to be supplied to the motor, and thus, to control the number of rotations of the motor, in accordance with the operation amount of the variable speed switch operated by a user.

SUMMARY

In the above-described electric power tool, however, there has been a problem that, in a case where a brushless DC motor is used as the motor, when the operation switch is operated nearly at the maximum operation amount, the number of rotations of the motor is increased over an upper limit number of rotations set when the motor was designed, to thereby provide the user with a feeling of discomfort.

Specifically, since a permanent magnet is used as a rotor in the brushless DC motor, when the electric power tool is used for a long time or at short intervals and the temperature of the rotor rises, magnetic force of the permanent magnet constituting the rotor is decreased.

Then, when the motor is operated with no load in such a state, the number of rotations of the motor is abnormally increased, to thereby cause a problem that a feeling of discomfort is provided to the user and, eventually, usability of the electric power tool is degraded.

In one aspect of the present invention, it is desirable for an electric power tool including a motor with a rotor having a permanent magnet to suppress the number of rotations of the motor from being abnormally increased as the temperature of the motor rises and that usability is thereby degraded.

In an electric power tool according to one aspect of the present invention, as a power source thereof, a motor is provided whose rotor comprises a permanent magnet, and a control unit sets a control amount of the motor in accordance with operation of an operation portion and drive-controls the motor based on the control amount.

Further provided in the electric power tool of the present invention is a number-of-rotations detection unit that detects the number of rotations of the motor. During driving of the motor, when the number of rotations detected by the number-of-rotations detection unit has reached an upper limit number of rotations set in advance, the control unit shifts drive control of the motor to rotation control.

In such a rotation control, the control amount of the motor is made to be increased or decreased so that the number of rotations of the motor becomes a predetermined target number of rotations.

Therefore, according to the electric power tool of the present invention, after the number of rotations of the motor has reached the upper limit number of rotations during driving of the motor, the number of rotations of the motor is to be controlled to the target number of rotations, and it can be suppressed that the number of rotations of the motor is abnormally increased due to a rise in temperature of the rotor.

In the present invention, the electric power tool including the motor whose rotor comprises a permanent magnet can obtain the above-described effects. Here, a decrease in magnetic force in association with a rise in temperature is exhibited remarkably in the permanent magnet (so-called bonded magnet) formed by, for example, mixing magnetic powder with synthetic resin or rubber.

Therefore, in a second aspect of the present invention, the permanent magnet (so-called bonded magnet) may be formed by mixing magnetic powder with synthetic resin or rubber. According to the electric power tool including such a motor, the effects can be exerted more remarkably.

In the case of the motor whose rotor comprises this kind of permanent magnet (so-called bonded magnet), when the number of rotations of the motor is increased in association with a rise in temperature of the rotor, part of the rotor is detached and scattered in some cases due to centrifugal force generated by the rotation of the motor. According to the present invention, such a problem in the rotor can be improved.

Next, in the electric power tool according to a third aspect of the present invention, the control unit may set the control amount of the motor in accordance with an operation amount of the operation portion, and in a state in which the operation amount or the control amount is equal to or greater than a threshold value set in advance, when the number of rotations detected by the number-of-rotations detection unit has reached the upper limit number of rotations, the control unit may shift the drive control of the motor to the rotation control.

This is because it does not seem to happen that the number of rotations of the motor is increased to reach the upper limit number of rotations when the operation amount of the operation portion or the control amount of the motor is small.

In other words, in the present invention, as an execution condition of performing control in which whether the number of rotations of the motor has reached the upper limit number of rotations is determined and the drive control of the motor is thereby shifted to the rotation control, it is set that the operation amount of the operation portion or the control amount of the motor is equal to or greater than the threshold value.

Therefore, according to the present invention, it is possible, for example, when the number of rotations of the motor is erroneously detected by the number-of-rotations detection unit, to suppress that the drive control of the motor is shifted to the rotation control as a result of the erroneous determination that the number of rotations of the motor has reached the upper limit number of rotations, and the accuracy of the control of the motor can thereby be improved.

Next, in the electric power tool according to a fourth aspect of the present invention, in a state in which a temperature detected by a temperature detection unit is equal to or higher than an upper limit temperature set in advance, when the number of rotations detected by the number-of-rotations detection unit has reached the upper limit number of rotations, the control unit may shift the drive control of the motor to the rotation control.

That is, in the present invention, it is desirable to suppress that the number of rotations of the motor is abnormally increased due to decrease in magnetic force in association with rise in temperature of the rotor. Here, it is when the temperature of the rotor is raised that the number of rotations of the motor is abnormally increased.

Although it is difficult to directly detect the temperature of the rotor, if the temperature detection unit is provided in the electric power tool, it is possible to anticipate, from the detected temperature, a possibility that the number of rotations of the motor is increased due to a rise in temperature of the rotor.

Therefore, in the present invention, as an execution condition of performing control in which it is determined whether the number of rotations of the motor has reached the upper limit number of rotations and the drive control of the motor is thereby shifted to the rotation control, it is set that the temperature detected by the temperature detection unit is equal to or higher than the upper limit temperature.

Accordingly, also in the electric power tool according to the fourth aspect, the accuracy of the control of the motor can be improved similarly to the case of the electric power tool according to the third aspect.

In the present invention, the control unit may be configured by combining the technique in the third aspect and the technique in the fourth aspect with each other.

Specifically, the control unit may be configured to shift the drive control of the motor to the rotation control when the number of rotations detected by the number-of-rotations detection unit has reached the upper limit number of rotations, in the state where the operation amount of the operation portion or the control amount of the motor is equal to or greater than the threshold value and also in the state where the temperature detected by the temperature detection unit is equal to or higher than the upper limit temperature.

In the electric power tool according to a fifth aspect of the present invention, the upper limit number of rotations used by the control unit for determination of shifting the drive control of the motor may be set based on the number of rotations of the motor obtained when the motor is driven in a state in which a temperature of the motor is within a normal range.

That is, this makes it possible to control the number of rotations of the motor to the target number of rotations without delay in response, before the temperature of the motor (and thus, of the rotor) exceeds the normal range and the number of rotations of the motor is so increased as to provide the user with a feeling of discomfort.

BRIEF DESCRIPTION OF THE DRAWINGS

An embodiment of the present invention will be described below with reference to accompanying drawings, in which:

FIG. 7 is a time chart showing change in the number of rotations of a motor.

The present invention is not limited to specific means, structures, and the like shown in the embodiment below, and can take various forms within the scope not departing from the spirit of the present invention. Furthermore, forms in which part of the configuration of the embodiment described below is omitted to an extent in which the problems can be solved are also embodiments of the present invention, and forms obtained by appropriately combining a plurality of possible embodiments are also embodiments of the present invention.

DETAILED DESCRIPTION OF THE PREFERRED EMBODIMENTS

In the present embodiment, an explanation will be given about a case where the present invention is applied to a rechargeable driver drill as an electric power tool.

Figure 1:
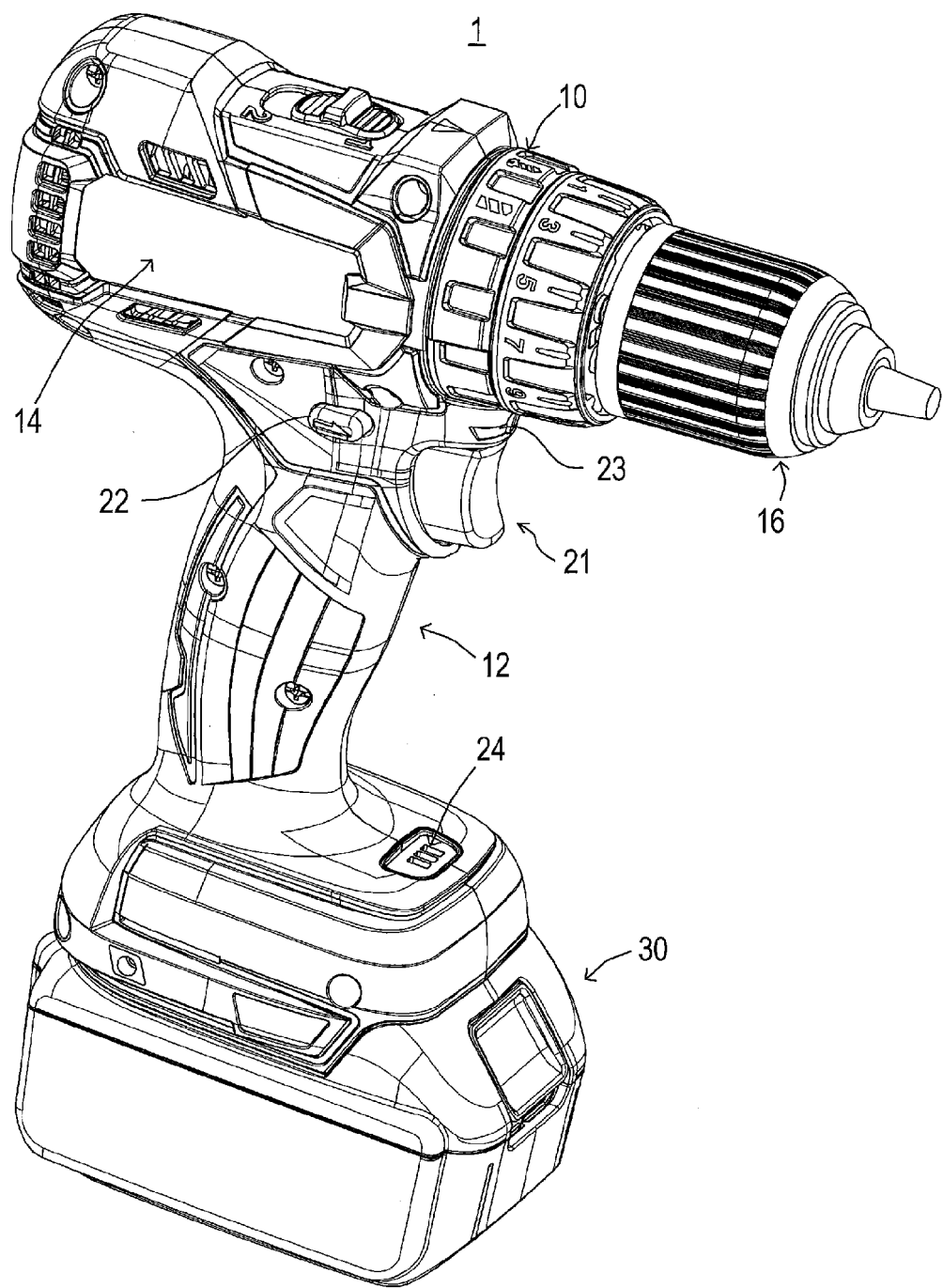
FIG. 1 is a perspective view showing an external appearance of a rechargeable driver drill according to the embodiment.
Figure 2:
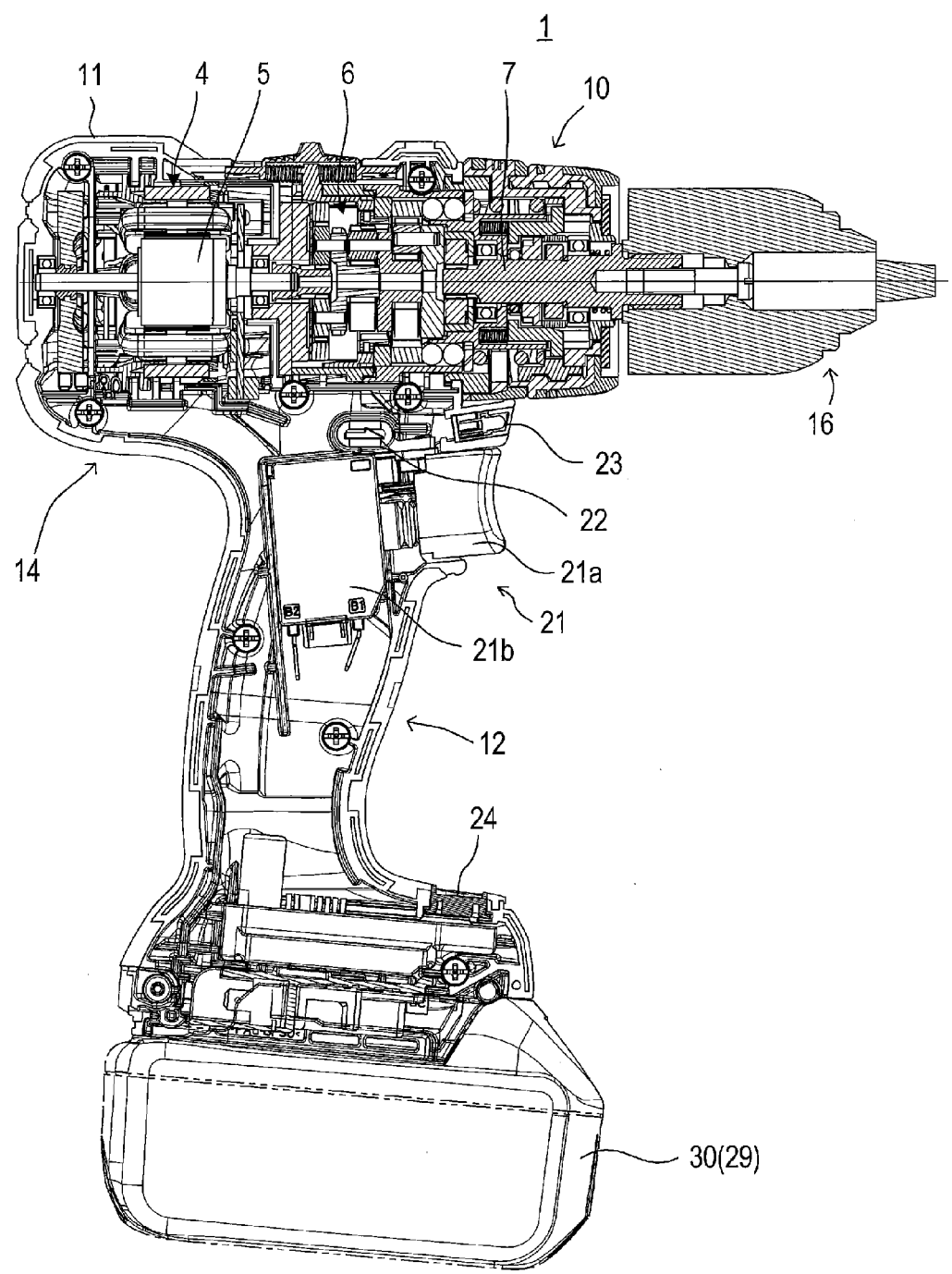
FIG. 2 is a sectional view showing an internal configuration of the rechargeable driver drill.

As shown in FIGS. 1 and 2, a rechargeable driver drill 1 of the present embodiment comprises a tool main body 10, and a battery pack 30 that supplies electric power to the tool main body 10.

The tool main body 10 includes a housing 11 having a grip portion 12 to be gripped by a user's hand provided thereto in a downwardly projecting manner. The tool main body 10 is configured such that various constituent parts are housed in the housing 11.

Provided at the back of the housing 11 (on the left side of the drawings) is a motor housing portion 14 that houses a motor 4, which is a power source of the rechargeable driver drill 1. In a position anterior to the motor housing portion 14, a deceleration mechanism 6 is housed.

Provided at a leading end of the housing 11 (on the right side of the drawings) in a projecting manner is a chuck portion 16 for attachment of a tool bit (not shown) to an output shaft 7 of the deceleration mechanism 6.

On the grip portion 12, a trigger switch 21 is provided that the user operates with a finger while gripping the grip portion 12.

The trigger switch 21 includes an operation portion 21a and a main portion 21b. The operation portion 21a is pull-operated by an operator. The main portion 21b is configured to be turned on/off by such a pull-operation of the operation portion 21a, and is configured such that a resistance value is varied in accordance with an operation amount (pulling amount) of the operation portion 21a.

Provided at an upper side of the trigger switch 21 (on a lower end of the housing 11) is a forward/reverse selector switch 22 that switches a rotational direction of the motor 4 to a forward direction or a reverse direction.

Provided at a lower front of the housing 11 is a lighting LED 23 that irradiates light toward the front of the rechargeable driver drill 1 when the operation portion 21a is pull-operated.

Provided at a lower front of the grip portion 12 is a remaining amount display portion 24 that displays a remaining amount of power of a battery 29 in the battery pack 30.

At a lower end of the grip portion 12, the battery pack 30 in which the battery 29 is housed is attached in an attachable/detachable manner. The battery pack 30 is attached to the lower end of the grip portion 12 by being slid from the front side toward the rear side of the grip portion 12.

The battery 29 housed in the battery pack 30 is a rechargeable battery, which can be charged repeatedly, such as a lithium ion rechargeable battery.

The motor 4 comprises a three-phase brushless DC motor, in which a rotor 5 comprises the above-described bonded magnet. The motor 4 is provided with a hall IC 50 (see FIG. 3) that detects a rotational position of the motor 4.

The hall IC 50 is a known one that includes three hall elements arranged correspondingly to respective phases of the motor 4 and generates a rotation detection signal for each predetermined rotation angle of the motor 4.

In the grip portion 12, a motor driving device 40 (see FIG. 3) is provided that drive-controls the motor 4 by receiving power supply from the battery pack 30.

Figure 3:
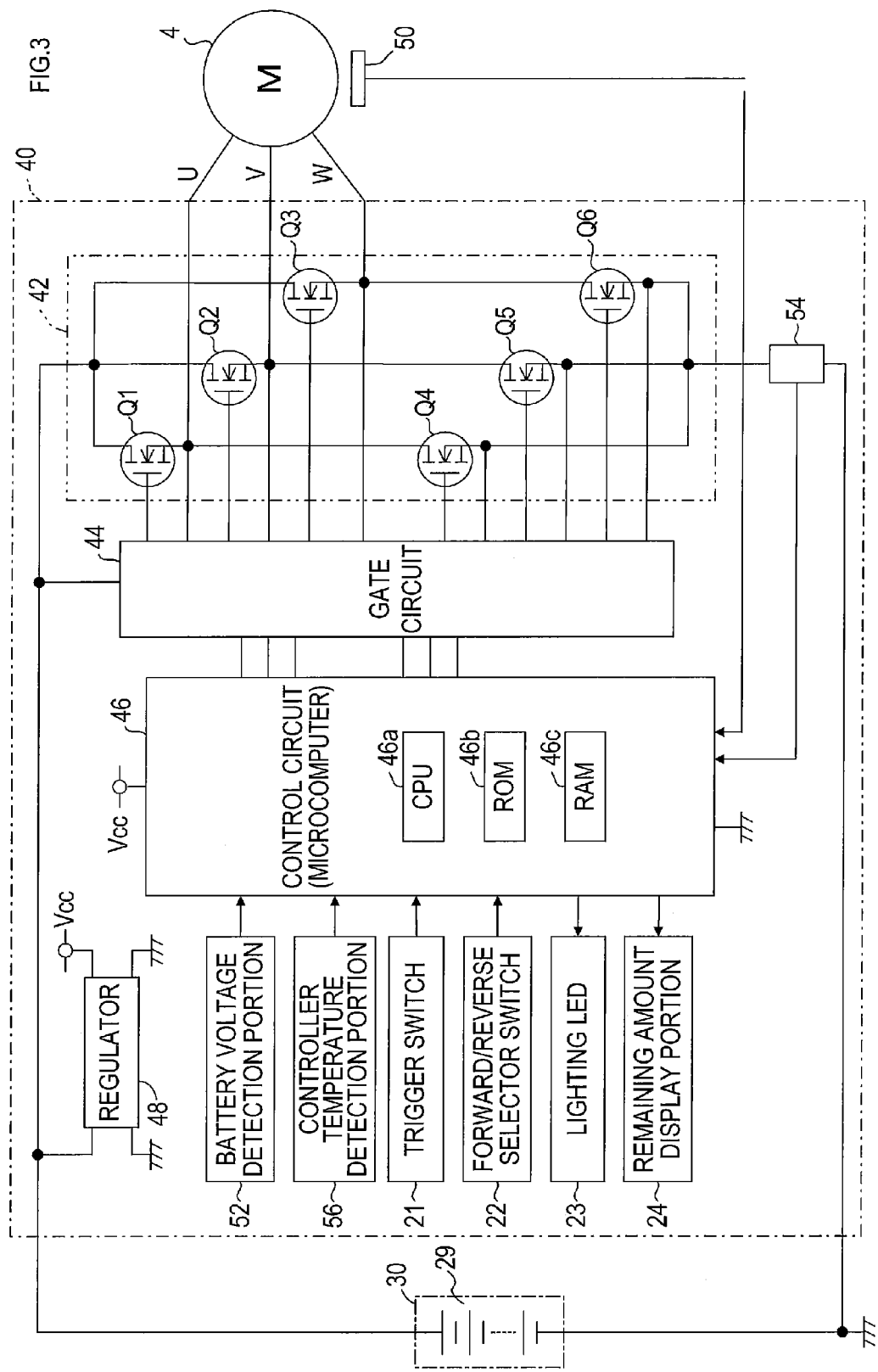
FIG. 3 is a block diagram showing a configuration of a motor driving device included in the rechargeable driver drill.

As shown in FIG. 3, the motor driving device 40 includes a drive circuit 42, a gate circuit 44, a control circuit 46, and a regulator 48.

The drive circuit 42 passes a current through windings of the respective phases of the motor 4 by receiving power supply from the battery 29. In the present embodiment, the drive circuit 42 is constituted as a three-phase full-bridge circuit, which comprises six switching elements Q1 to Q6. In the present embodiment, each of the switching elements Q1 to Q6 is a MOSFET.

In the drive circuit 42, the three switching elements Q1 to Q3 are provided, as so-called high-side switches, between respective terminals U, V, and W of the motor 4 and a power-supply line connected to a positive side of the battery 29.

The other three switching elements Q4 to Q6 are provided, as so-called low-side switches, between the respective terminals U, V, and W of the motor 4 and a ground line connected to a negative side of the battery 29.

The gate circuit 44 passes a current through the windings of the respective phases of the motor 4 by turning on/off the respective switching elements Q1 to Q6 in the drive circuit 42 in accordance with a control signal outputted from the control circuit 46, to thereby rotate the motor 4.

The control circuit 46 comprises a microcomputer mainly composed of a CPU 46a, a ROM 46b, and a RAM 46c. Connected to the control circuit 46 are the trigger switch 21 (specifically, the main portion 21b thereof), the forward/reverse selector switch 22, the lighting LED 23, and the remaining amount display portion 24, which have been described above.

In the motor driving device 40, provided in a current path extending from the drive circuit 42 to the negative side of the battery 29 is a current detection circuit 54 that detects a current flowing through the motor 4. A current detection signal is inputted from the current detection circuit 54 to the control circuit 46.

Further provided in the motor driving device 40 are a battery voltage detection portion 52 that detects a voltage (battery voltage) supplied from the battery 29, and a controller temperature detection portion 56 that detects a temperature of the motor driving device 40.

Detection signals from the respective detection portions 52 and 56 and a detection signal from the hall IC 50 provided to the motor 4 are also inputted into the control circuit 46.

When the trigger switch 21 is operated, the control circuit 46 evaluates a rotational position and a rotational speed of the motor 4 based on the rotation detection signal from the hall IC 50, and drives the motor 4 in a predetermined rotational direction in accordance with a rotational direction setting signal from the forward/reverse selector switch 22.

When the motor 4 is driven, the control circuit 46 sets a control amount of the motor 4 in accordance with the operation amount (pulling amount) of the trigger switch 21.

The control amount of the motor 4 is a driving duty ratio (hereinafter also referred to simply as a duty) of the control signal outputted to the gate circuit 44 in order to turn on/off the switching elements Q1 to Q6 constituting the drive circuit 42.

The control circuit 46 rotationally drives the motor 4 by outputting the control signal corresponding to the control amount (duty) set as above to the gate circuit 44.

Besides such a drive control to drive the motor 4, the control circuit 46 also performs a control to light up the lighting LED 23 during motor driving, and a display process to display the remaining amount of power of the battery 29 on the remaining amount display portion 24.

The regulator 48 generates a constant power-supply voltage Vcc (DC 5 V, for example) required for operation of the control circuit 46 by receiving power supply from the battery 29. The control circuit 46 is operated by being supplied with the power-supply voltage Vcc from the regulator 48.

Next, from among various control processes performed by the control circuit 46, an explanation will be given below about a motor driving process performed to drive the motor 4 in accordance with the operation of the trigger switch 21 by the user, with reference to flowcharts shown in FIGS. 4 to 6.

This motor driving process is achieved by execution, by the CPU 46a constituting the control circuit 46, of a program stored in the ROM 46b, which is a non-volatile storage medium.

Figure 4:
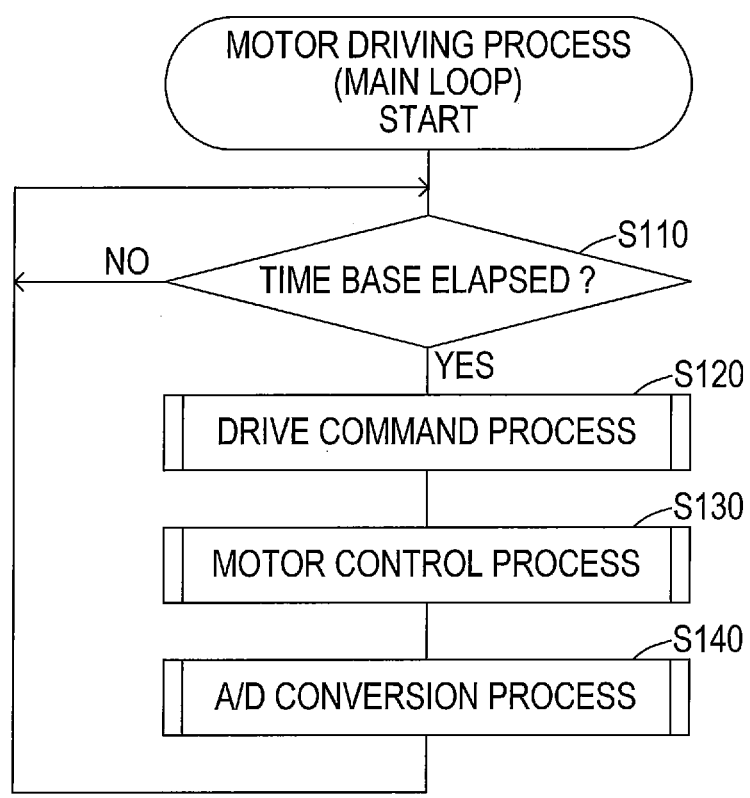
FIG. 4 is a flowchart showing a motor driving process performed by a control circuit.

As shown in FIG. 4, in the motor driving process, it is first determined in S110 (S represents a step) whether a predetermined time base, which is a control cycle for motor driving, has elapsed.

If the time base has not elapsed, the process in S110 is performed again to thereby wait elapse of the time base. When the time base has elapsed, a drive command process in S120, a motor control process in S130, and an A/D conversion process in S140 are sequentially performed, and the process proceeds to S110 again.

That is, in the motor driving process of the present embodiment, a series of processes in S120 to S140 are performed periodically on the predetermined time base.

In the drive command process in S120, the operation of the trigger switch 21 is detected, and the control amount (duty) is set in accordance with the operation amount (pulling amount) of the trigger switch 21.

In S120, a so-called soft start (see FIG. 7) is performed in which, immediately after the trigger switch 21 is operated, the number of rotations of the motor 4 is increased gradually by increasing the control amount (duty) gradually up to a value corresponding to the operation amount (pulling amount) of the trigger switch 21.

Next, in the motor control process in S130, the control signal corresponding to the control amount (duty) set in the drive command process is outputted to the gate circuit 44, and the motor 4 is thereby driven.

In the A/D conversion process in S140, detection signals inputted from the battery voltage detection portion 52, the controller temperature detection portion 56, the current detection circuit 54, and the like are imported via an A/D conversion circuit (not shown) in the control circuit 46, and a battery voltage, a controller temperature, and a motor current are thereby detected respectively.

Figure 5:
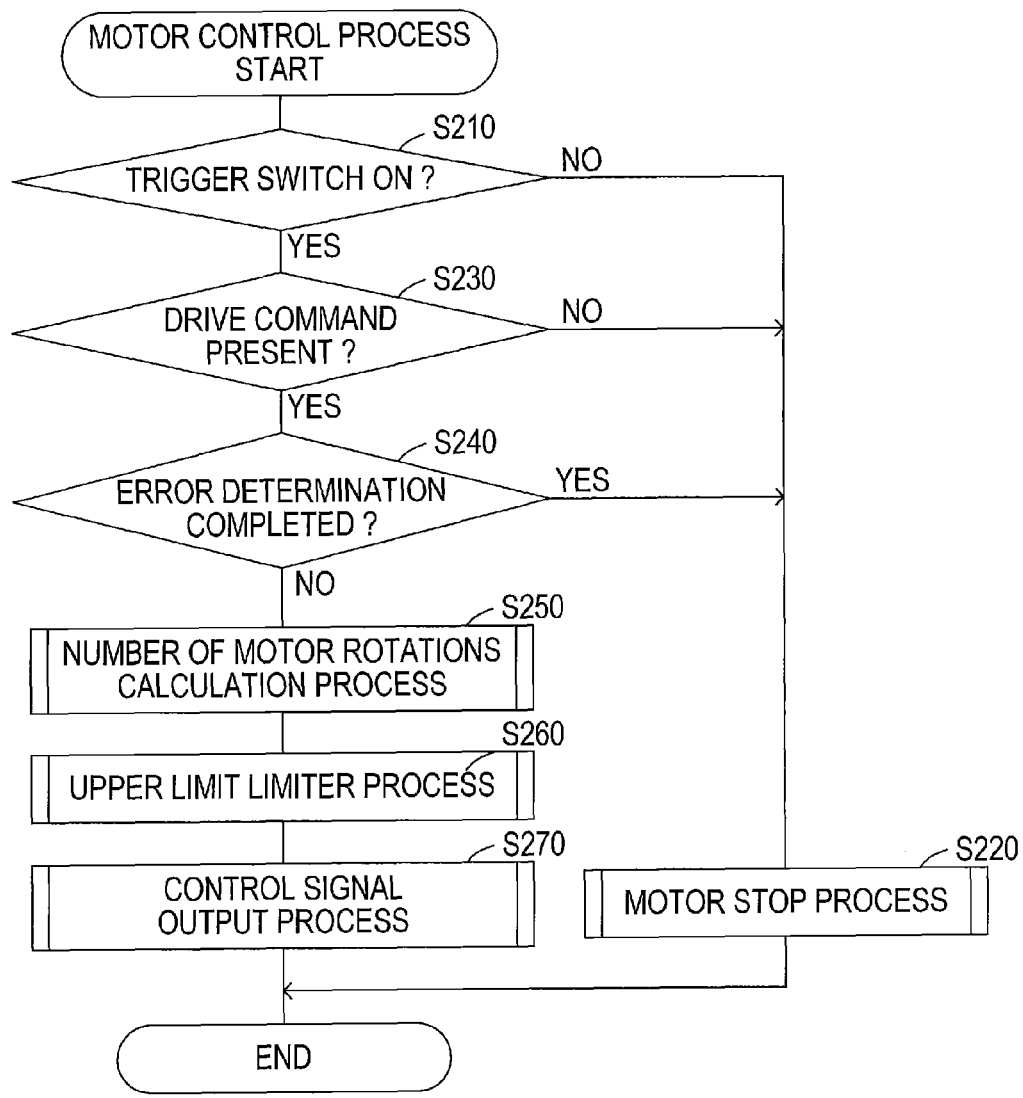
FIG. 5 is a flowchart showing a motor controlling process shown in FIG. 4.

The motor control process in S140 is performed through procedures shown in FIG. 5.

Specifically, in the motor control process, it is first determined in S210 whether the trigger switch 21 is in an ON state. If the trigger switch 21 is not in an ON state, (i.e., if the trigger switch 21 is not operated), the process proceeds to S220. In S220, a motor stop process to stop the motor 4 is performed, and the motor control process is terminated.

In contrast, if it is determined in S210 that the trigger switch 21 is in an ON state, the process proceeds to S230, and it is determined whether a command to drive the motor 4 has been set in the drive command process in S120 (i.e., whether the control amount of the motor 4 has been set).

If the command to drive the motor 4 has not been set, the motor stop process in S220 is performed, and then, the motor control process is terminated. If the command to drive the motor 4 has been set, the process proceeds to S240.

In S240, it is determined whether an abnormality in a battery voltage, a controller temperature, a motor current, and the like has been detected in an abnormality detection process separately performed by the control circuit 46. If it is determined in S240 that an abnormality has been detected (i.e., when a determination that an error exists has been completed), the motor stop process in S220 is performed, and then, the motor control process is terminated.

In contrast, if it is determined in S240 that no abnormality has been detected, the process proceeds to S250, and the number of rotations of the motor 4 (the rotor 5, in other words) is calculated from a time interval of the rotation detection signals inputted from the hall IC 50 for each predetermined rotational angle of the motor 4.

In subsequent S260, it is determined whether the number of rotations of the motor 4 calculated in S250 has reached an upper limit number of rotations set in advance. Further in S260, if the number of rotations has reached the upper limit number of rotations, an upper limit limiter process is performed in which the control amount (output duty) actually to be used for driving of the motor 4 is set so that the number of rotations becomes equal to or smaller than the upper limit number of rotations.

When this upper limit limiter process is performed, the process proceeds to S270. In S270, a control signal corresponding to the output duty set in the upper limit limiter process is outputted to the gate circuit 44, and the motor control process is terminated.

Figure 6:
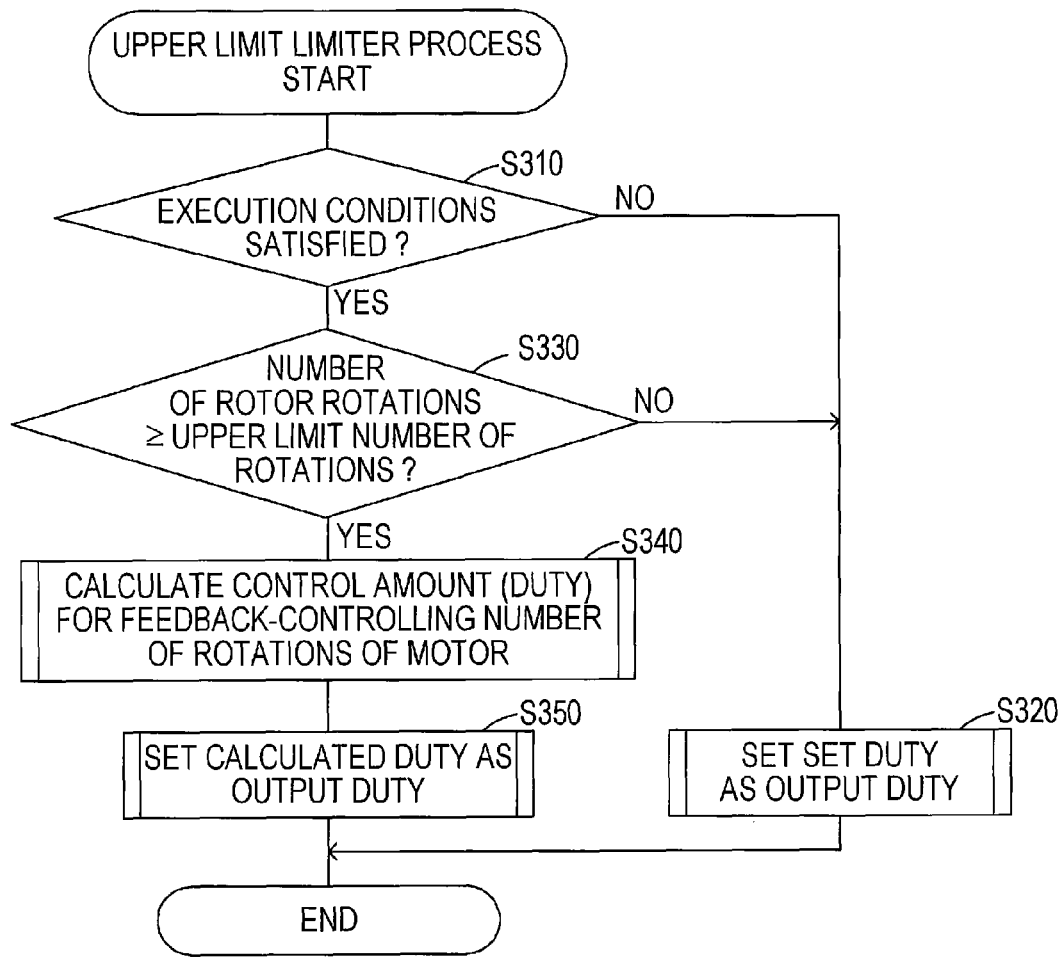
FIG. 6 is a flowchart showing an upper limit limiter process shown in FIG. 5.

The upper limit limiter process in S260 is performed through procedures shown in FIG. 6.

As shown in FIG. 6, when the upper limit limiter process is started, it is first determined in S310 whether execution conditions of the upper limit limiter process are satisfied.

In the present embodiment, as the execution conditions of the upper limit limiter process, the following three conditions are set. In S310, when these three conditions are all satisfied, it is determined that the execution conditions of the upper limit limiter process are satisfied.

(1) The control amount (duty) set in accordance with the operation amount (pulling amount) of the trigger switch 21 in the drive command process is equal to or greater than a threshold value (90%, for example), and there is a possibility that the number of rotations may exceed the upper limit number of rotations due to a rise in temperature of the motor 4.

(2) The controller temperature is equal to or higher than a threshold value set in advance, and there is a possibility that the number of rotations of the motor 4 may exceed the upper limit number of rotations.

(3) The current detected by the current detection circuit 54 is equal to or greater than a threshold value, and there is a possibility that the number of rotations of the motor 4 may exceed the upper limit number of rotations.

The above-described three conditions are all set in order to determine whether there is a possibility that the number of rotations may exceed the upper limit number of rotations during no-load operation of the motor 4 due to a decrease in magnetic force of the rotor 5 caused by a rise in temperature of the rotor 5 induced by continuous driving of the motor 4 or the like.

Therefore, the above-described three conditions do not necessarily have to be employed all together as the execution conditions of the upper limit limiter process, and one or two of the three conditions may be chosen.

Although the condition (1) is specified such that the control amount (duty) set in accordance with the operation amount (pulling amount) of the trigger switch 21 is equal to or greater than a threshold value, the condition (1) may be specified such that the operation amount (pulling amount) of the trigger switch 21 is equal to or greater than a threshold value.

That is, since the control amount (duty) of the motor 4 is set in accordance with the operation amount (pulling amount) of the trigger switch 21, either may be utilized as a parameter in the condition (1).

The upper limit number of rotations may be any number of rotations as long as it can suppress that increase in the number of rotations during no-load operation of the motor 4 provides the user with a feeling of strangeness and usability of the rechargeable driver drill 1 is thereby degraded. In the present embodiment, based on the number of rotations detected when the motor 4 is driven at a maximum control amount (duty=100%, for example) in a state in which the temperature of the motor 4 (the rotor 5, specifically) is within a normal range, the number of rotations greater than such a basic number of rotations by a predetermined number of rotations is set as the upper limit number of rotations.

Next, if it is determined in S310 that the execution conditions of the upper limit limiter process are not satisfied, the process proceeds to S320. In S320, the control amount (set duty) set in the drive command process in S120 is set as the control amount (output duty) used to drive the motor 4, and the upper limit limiter process is terminated.

If it is determined in S310 that the execution conditions of the upper limit limiter process are satisfied, the process proceeds to S330. In S330, it is determined whether the number of rotations of the motor 4 calculated in a number-of-rotations calculation process in S250 is equal to or greater than the upper limit number of rotations.

If the number of rotations of the motor 4 is less than the upper limit number of rotations, the process proceeds to S320. In S320, the control amount (set duty) set in S120 is set as the control amount (output duty) used to drive the motor 4, and the upper limit limiter process is terminated.

If it is determined in S330 that the number of rotations of the motor 4 is equal to or greater than the upper limit number of rotations, in S340, the control amount (duty) is updated by a proportional (P) control or a proportional-integral (PI) control so that the number of rotations of the motor 4 becomes a predetermined target number of rotations.

In other words, in S340, the control amount (duty) for feedback-controlling the number of rotations of the motor 4 is calculated based on a difference between these respective numbers of rotations so that the number of rotations of the motor 4 becomes the target number of rotations.

In subsequent S350, the control amount (calculated duty) calculated in S340 is set as the control amount (output duty) used to drive the motor 4, and the upper limit limiter process is terminated.

As above, in the rechargeable driver drill 1 according to the present embodiment, if the execution conditions of the upper limit limiter process are not satisfied, or if the number of rotations of the motor 4 has not reached the upper limit number of rotations even when the execution conditions are satisfied, the motor 4 is driven with the control amount (set duty) set in accordance with the operation amount (pulling amount) of the trigger switch 21.

Accordingly, in this state, the motor 4 is to be open-loop-controlled in accordance simply with the operation amount of the trigger switch 21 independently of the number of rotations of the motor 4.

Thus, as shown in FIG. 7, in a case, for example, where the user operates the trigger switch 21 at a maximum operation amount in a state in which the motor 4 is stopped, the control amount (duty) of the motor 4 is gradually increased up to the maximum value (duty=100%, for example) corresponding to the operation amount of the trigger switch 21. Correspondingly, the number of rotations of the motor 4 is increased up to the number of rotations at full speed corresponding to duty=100%.

When the motor 4 is driven at duty=100% as above, the temperature of the motor 4 is raised by such a driving, and the magnetic force of the rotor 5 is decreased with the rise in the temperature. At such a time, even after the number of rotations has reached the number of rotations at full speed, the number of rotations of the motor 4 may be increased gradually as the temperature rises, in some cases.

However, in the rechargeable driver drill 1 of the present embodiment, when the number of rotations of the motor 4 has reached the upper limit number of rotations (time point t1 shown in FIG. 7), in the upper limit limiter process, the motor 4 is feedback-controlled (closed-loop-controlled) so as to achieve the target number of rotations.

Therefore, according to the rechargeable driver drill 1 of the present embodiment, it is possible to suppress that the number of rotations of the motor 4 is increased to exceed the upper limit number of rotations due to rise in the temperature of the motor 4, and that usability of the rechargeable driver drill 1 is degraded due to such increase in the number of rotations.

In the present embodiment, since the rotor 5 in the motor 4 comprises a bonded magnet, when the rotor 5 is raised in temperature and driven at high rotational speed, part of the rotor 5 may be detached and scattered in some cases. However, in the present embodiment, such a problem can be improved because the number of rotations of the motor 4 can be limited to the upper limit number of rotations.

In the present embodiment, as the execution conditions of the upper limit limiter process that limits the upper limit of the number of rotations of the motor 4, the control amount (duty), the controller temperature, and the motor current of the motor 4 are set as described in the above (1) to (3), respectively, and the upper limit limiter process is designed to be performed only when there is a possibility that the number of rotations of the motor 4 may exceed the upper limit number of rotations.

Therefore, it is possible, for example, when the number of rotations of the motor 4 is erroneously detected in the number-of-rotations calculation process in S250, to suppress that the control amount (duty) is updated based on the erroneously detected number of rotations in S340, and further to improve the accuracy of the control of the motor 4.

In the present embodiment, the control circuit 46 corresponds to one example of a control unit of the present invention, and the controller temperature detection portion 56 corresponds to one example of a temperature detection unit of the present invention. A function as one example of a number-of-rotations detection unit of the present invention is achieved by the hall IC 50 and the process in S250, in which the number of rotations of the motor 4 is calculated based on the detection signal from the hall IC 50.

Although one embodiment of the present invention has been described hereinabove, the present invention is not limited to the above-described embodiment, and can take various forms within the scope not departing from the spirit of the present invention.

For example, although the above-described embodiment has been described as including the controller temperature detection portion 56 as the temperature detection unit, the temperature detection unit may be achieved by providing a temperature sensor on a substrate on which the motor 4 or the hall IC 50 is mounted.

Such a configuration enables more accurate detection of the temperature in the vicinity of the rotor 5, and thus, it is possible to anticipate the increase in rotation of the rotor 5 accompanying the rise in temperature thereof more accurately, and to cause the upper limit limiter process in S330 to S350 to be performed.

In the above-described embodiment, the electric power tool has been described in which the control amount of the motor 4 is set in accordance with the operation amount (pulling amount) of the trigger switch 21 by the operator. However, the present invention is not limited to this, and can be applied to an electric power tool configured such that, when the trigger switch 21 is pulled in a predetermined amount, the control amount is kept constant even if the trigger switch 21 is further pulled, or to an electric power tool, in which a drive switch comprises an ON/OFF switch.

What is claimed is:

1. An electric power tool comprising:
   a motor comprising a rotor, the rotor comprising a permanent magnet;
   a control unit that is configured to set a control amount of the motor in accordance with operation of an operation portion and to drive-control the motor based on the control amount; and
   a number-of-rotations detection unit that is configured to detect the number of rotations of the motor,
   wherein the control unit is configure to shift drive control of the motor to rotation control, in which the control amount is made to be increased or decreased so that the number of rotations of the motor becomes a predetermined target number of rotations during driving of the motor, when at least one predetermined execution condition is satisfied and the number of rotations detected by the number-of-rotations detection unit has reached an upper limit number of rotations set in advance, the at least one execution condition being a condition that there is a possibility that the number of rotations may exceed the upper limit number of rotations during no-load operation of the motor due to a decrease in magnetic force of the rotor caused by a rise in temperature of the rotor.

2. The electric power tool according to claim 1,
   wherein the permanent magnet is formed by mixing magnetic powder with synthetic resin or rubber.

3. The electric power tool according to claim 1,
   wherein the control unit is configured to set the control amount of the motor in accordance with an operation amount of the operation portion, and
   wherein the at least one execution condition comprises a condition that the operation amount or the control amount is equal to or greater than a threshold value set in advance.

4. The electric power tool according to claim 1, further comprising a temperature detection unit,
   wherein the at least one execution condition comprises a condition that a temperature detected by the temperature detection unit is equal to or higher than an upper limit temperature set in advance.

5. The electric power tool according to claim 1,
wherein the upper limit number of rotations is set based on the number of rotations of the motor obtained when the motor is driven in a state in which a temperature of the motor is within a normal range.

6. The electric power tool according to claim 1, further comprising a current detection unit that is configured to detect a current flowing through the motor,
wherein the at least one execution condition comprises a condition that the current detected by the current detection unit is equal to or higher than a threshold value set in advance.

* * * * *